United States Patent
Tamagawa

(10) Patent No.: US 9,485,390 B2
(45) Date of Patent: Nov. 1, 2016

(54) METHOD FOR CREATING COLOR PROFILE

(71) Applicant: FUJIFILM Corporation, Tokyo (JP)

(72) Inventor: Kiyomi Tamagawa, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/987,017

(22) Filed: Jan. 4, 2016

(65) Prior Publication Data

US 2016/0212301 A1 Jul. 21, 2016

(30) Foreign Application Priority Data

Jan. 15, 2015 (JP) ................... 2015-005750

(51) Int. Cl.
*H04N 1/54* (2006.01)
*G06K 15/02* (2006.01)
*H04N 1/60* (2006.01)

(52) U.S. Cl.
CPC ............ *H04N 1/54* (2013.01); *G06K 15/1868* (2013.01); *G06K 15/1878* (2013.01); *H04N 1/60* (2013.01)

(58) Field of Classification Search
CPC ...... H04N 1/54; H04N 1/60; G06K 15/1868; G06K 15/1878
See application file for complete search history.

(56) References Cited

U.S. PATENT DOCUMENTS

| 8,040,563 B2 * | 10/2011 | Maki | H04N 1/6025 358/1.9 |
| 8,854,690 B2 * | 10/2014 | Ukishima | G06F 3/1219 358/3.23 |
| 2007/0285694 A1 | 12/2007 | Horita | |
| 2014/0085683 A1 | 3/2014 | Ukishima | |

FOREIGN PATENT DOCUMENTS

JP   2007-329737 A   12/2007
JP   2014-068198 A   4/2014

* cited by examiner

*Primary Examiner* — Quang N Vo
(74) *Attorney, Agent, or Firm* — Studebaker & Brackett PC

(57) ABSTRACT

The method includes creating: a first table defining conversion relationship from a signal of a first standard color to which limitation of a total amount of ink is not applied into a signal of a second standard color to which the limitation is applied; a second table defining conversion relationship from the signal of the second standard color into a first expansion color signal to which the limitation is applied; a third table defining conversion relationship from a color signal in a device-independent color space corresponding to the signal of the second standard color into a color signal in a device-dependent color space; and a fourth table (color profile) defining conversion relationship from a color signal in the device-independent color space corresponding to the signal of the second standard color into a second expansion color signal in the device-dependent color space by the third and second tables.

14 Claims, 12 Drawing Sheets

METHOD FOR CREATING COLOR PROFILE

CROSS-REFERENCE TO RELATED APPLICATIONS

The patent application claims priority under 35 U.S.C. §119 to Japanese Patent Application No. 2015-005750 filed on Jan. 15, 2015. Each of the above application is hereby expressly incorporated by reference, in its entirety, into the present application.

BACKGROUND OF THE INVENTION

1. Field of the Invention

The presently disclosed subject matter relates to a method for creating a color profile, and particularly, to conversion processing technology of a color image signal to be used in image formation of a color image formed on a medium by using an ink containing one or more kinds of ink of specific colors.

2. Description of the Related Art

As a method for managing colors in offset printing, a color management system using an ICC profile is known. ICC is an abbreviation for International Color Consortium.

The color management system using an ICC profile creates a color chart including a patch corresponding to respective signals of cyan, magenta, yellow, and black, and a patch corresponding to a signal created by combining at least two kinds of signals of cyan, magenta, yellow, and black, and allows the color chart created to be printed. Then, a colorimetric value of the color chart printed on a medium is acquired to create a color profile that describes a conversion relationship between a signal value of each of cyan, magenta, yellow, and black, and a Lab value corresponding to a colorimetric value of the signal value.

In creation of a color profile in a case of image formation using four-color ink, if ink of each of the four colors is used at a usage rate of 100 percent, a color patch is printed with an indication of the usage rate of 400 percent.

In image formation by offset printing and an electrophotographic method, a chart including a color patch at a usage rate of ink of 400 percent can be printed without problems. Unfortunately, there is a limit of the amount of ink that can be absorbed into paper used as a medium in image formation by an ink-jet method. In general, paper used in an image forming apparatus by the ink-jet method is only available for printing of a color patch at a usage rate of ink up to about 200 percent to 250 percent.

Thus, an image formation by the ink-jet method uses image processing that applies limitation of a total amount of ink.

Here, the usage rate is a scale indicating the amount of ink usage, and is expressed in percentage according to a form of the ICC profile. The usage rate is indicated at 0 percent if no ink is used, and at 100 percent if ink is used up to a maximum.

Image processing applying limitation of a total amount of ink includes processing in which cyan ink, magenta ink, and yellow ink are substituted with black ink by GCR processing so that the amount of the cyan ink, the magenta ink, and the yellow ink is reduced to limit a total amount of the ink.

The GCR processing is also called gray conversion in which cyan, magenta, and yellow are removed from a gray portion to express gray by only gradation of black. GCR is an abbreviation for gray-component replacement.

In addition, image processing applying another limitation of a total amount of ink includes a method of processing each of a signal of gradation of a single color, and a signal of two or more colors, so that ink for each of the signals is within an upper limit value of a total amount of each of the ink.

Japanese Patent Application Laid-Open No. 2014-068198 describes a method and program for creating a table of limiting a total amount of a color material, the table being used to convert a signal value to limit the amount of ink to be applied to a medium. The method and program for creating the table of limiting a total amount of a color material described in Japanese Patent Application Laid-Open No. 2014-068198 allocate a total amount of ink to a division of a color reproduction area according to an upper limit value of the total amount of ink to determine limitation of a total amount of ink of the whole of the color reproduction area. The color material described in Japanese Patent Application Laid-Open No. 2014-068198 includes ink and a toner.

In recent years, a specific color other than process colors, such as cyan, magenta, yellow, and black, is additionally used in an output device, such as an image forming apparatus. The specific color includes orange, green, violet, and the like.

Japanese Patent Application Laid-Open No. 2007-329737 describes an apparatus of creating definition of color conversion and a program of creating definition of color conversion, using orange and green in addition to process colors of cyan, magenta, yellow, and black.

SUMMARY OF THE INVENTION

Unfortunately, each of the method and program for creating a table of limiting a total amount of a color material, described in Japanese Patent Application Laid-Open No. 2014-068198, cannot be applied as it is if ink including one or more kinds of specific colors is used, and thus it is required to create a color profile by an additional method based on an additional method of limiting a total amount of ink.

The apparatus of creating definition of color conversion and the program of creating definition of color conversion, described in Japanese Patent Application Laid-Open No. 2007-329737, temporarily create a table of conversion from a signal of each of cyan, magenta, yellow, black, orange, and green into a Lab value to create a table of a relationship of conversion from the Lab value into the signal of each of cyan, magenta, yellow, black, orange, and green. Then, the conversion from the Lab value into the signal of each of cyan, magenta, yellow, black, orange, and green, is acquired by inversely performing the conversion from the signal of each of cyan, magenta, yellow, black, orange, and green, into the Lab value.

For that, it is required to print a chart for acquiring a Lab value with respect to a combination of each of signal values of cyan, magenta, yellow, black, orange, and green, to create a conversion table of a color space from colorimetric values in the chart printed.

Then, complicated calculation as follows is required: only a patch less than an upper limit value of limitation of a total amount of ink in combinations of each of cyan ink, magenta ink, yellow ink, black ink, orange ink, and green ink, is printed; and a color profile is created while a Lab value in an area exceeding the upper limit of limitation of a total amount of ink is predicted on the basis of a Lab value acquired by measuring colorimetric value of the patch printed.

The presently disclosed subject matter is made in light of the above-mentioned circumstances, and it is an object to provide a method for creating a color profile capable of creating a color profile of signals of color including a signal of specific color without performing complicated prediction calculation of predicting a Lab value in an area exceeding an upper limit of limitation of a total amount of ink.

In order to achieve the object described above, a first aspect provides a method for creating a color profile that is to be applied to image formation by an ink-jet method using ink of standard colors composed of three or more kinds of colors, and one or more kinds of ink of specific colors acquired by mixing two or more kinds of the ink of standard colors, and the method for creating a color profile includes: a step of creating a first table that defines a conversion relationship from a signal of a first standard color to which limitation of a total amount of ink is not applied, the signal of the first standard color expressing a standard color, into a signal of a second standard color to which the limitation of a total amount of ink is applied; a step of creating a second table that defines a conversion relationship from a signal of the second standard color outputted according to the first table into a first expansion color signal including one or more kinds of signals of specific colors in which the signal of the second standard color and a plurality of standard signals of colors are mixed, to which first expansion color signal the limitation of a total amount of ink is applied; a step of creating a third table that defines a conversion relationship from a color signal in a device-independent color space corresponding to the signal of the second standard color in the first expansion color signal into a color signal in a device-dependent color space on the basis of a conversion relationship from a color signal in the device-dependent color space into a color signal in the device-independent color space, acquired by converting the first expansion color signal outputted according to the second table into a color signal in the device-independent color space corresponding to the first expansion color signal outputted according to the second table; and a step of creating a fourth table serving as a color profile that defines a conversion relationship from a color signal in the device-independent color space, corresponding to the signal of the second standard color, in the first expansion color signal, into a second expansion color signal including one or more kinds of signals of specific colors mixed with a plurality of signals of standard colors in the device-dependent color space, by using the conversion relationship defined by the third table and the conversion relationship defined by the second table.

According to the first aspect, it is possible to create a color profile defining a conversion relationship from a device-independent color space into a device-dependent color space in an expansion color signal including one or more kinds of specific colors by using a conversion relationship from a device-independent color space into a device-dependent color space in a signal of a standard color to which limitation of a total amount of ink is applied, and a conversion relationship from a signal of a standard color to which the limitation of a total amount of ink is applied into the expansion color signal including one or more kinds of specific colors to which the limitation of a total amount of ink is applied, without performing complicated prediction calculation in an area where the limitation of a total amount of ink is not satisfied.

In the method for creating a color profile described in the first aspect, a second aspect includes the step of creating a second table that includes a step of creating a rule of substitution of a signal value of a specific color component, in which step a maximum value of a signal of standard colors constituting the signal of a specific color is substituted with a maximum value of the signal of the specific color.

According to the second aspect, it is possible to provide excellent coloring performance of ink of a specific color at a maximum.

In the method for creating a color profile described in the second aspect, a third aspect includes the step of creating a second table that includes a step of acquiring a mixing ratio among the plurality of the signals of the standard colors that is to be substituted with the signal of the specific color, and in the step of creating a rule of substitution of a signal value of a specific color component, a rule of substituting the plurality of the signals of the standard colors with the signal of the specific color is created on the basis of the mixing ratio acquired.

According to the third aspect, the limitation of a total amount of ink is satisfied also in the ink of the specific color when the standard color is substituted with the specific color.

In the method for creating a color profile described in the second aspect or the third aspect, a fourth aspect includes the step of creating a rule of substitution of a signal value of a specific color component in which a rule of substituting the plurality of the signals of the standard colors with the signal of the specific color is created by using a function f(S) for defining a substitution ratio of the plurality of the signals of the standard colors with respect to chroma S.

According to the fourth aspect, it is possible to switch between a case of using mixed color of standard colors, and a case of using a specific color, according to chroma.

In the method for creating a color profile described in the fourth aspect, a fifth aspect includes the function f(S) that becomes zero in a low chroma area equal to or less than predetermined chroma.

According to the fifth aspect, using mixed color of ink of standard colors in the low chroma area enables intermediate gradation to be reproduced by using color balance of color representation by combination of the ink of standard colors, and if the intermediate gradation is required to be corrected, adjustment of the standard colors enables the intermediate gradation to be corrected, thereby improving operability in the adjustment.

In the method for creating a color profile described in any one of the second aspect to the fifth aspect, a sixth aspect includes the step of creating a rule of substitution of a signal value of a specific color component in which a rule of substituting the plurality of the signals of the standard colors with the signal of the specific color is created by using a function g(H) for defining a substitution ratio of the plurality of the signals of the standard colors with respect to hue H.

According to the sixth aspect, it is possible to switch between a case of using mixed color of standard colors, and a case of using a specific color, according to hue.

In the method for creating a color profile described in the sixth aspect, a seventh aspect includes the function g(H) that becomes one in an area not less than a predetermined first hue value and not more than a predetermined second hue value.

According to the seventh aspect, ink of a specific color is used in the area not less than the predetermined first hue value and not more than the predetermined second hue value.

In the method for creating a color profile described in any one of the first aspect to the seventh aspect, an eighth aspect includes the signal of the first standard color and the signal of the second standard color each of which is composed of a cyan signal expressing cyan, a magenta signal expressing magenta, a yellow signal expressing yellow, and a black signal expressing black.

According to the eighth aspect, it is possible to convert print data using cyan, magenta, yellow, and black, into image formation data of an ink-jet method, including one or more kinds of specific color.

In the method for creating a color profile described in the eighth aspect, a ninth aspect includes the first expansion color signal and the second expansion color signal each of which includes at least any one of an orange signal expressing orange, a green signal expressing green, and a violet signal expressing violet.

According to the ninth aspect, it is possible to convert print data using cyan, magenta, yellow, and black, into image formation data of an ink-jet method, using a specific color including at least any one of orange, green, and violet.

A tenth aspect provides a non-transitory tangible computer-readable recording medium including a program for creating a color profile that is to be applied to image formation by an ink-jet method using ink of standard colors composed of three or more kinds of color, and one or more kinds of ink of specific colors acquired by mixing two or more kinds of the ink of the standard colors, stored thereon, such that when the program is read and executed by a computer, the computer serves as: a device of creating a first table that defines a conversion relationship from a signal of a first standard color, to which limitation of a total amount of ink is not applied, the signal of the first standard color expressing a standard color, into a signal of a second standard color to which the limitation of a total amount of ink is applied; a device of creating a second table that defines a conversion relationship from a signal of the second standard color outputted according to the first table into a first expansion color signal including one or more kinds of signals of specific colors in which the signal of the second standard color and a plurality of standard signals of colors are mixed, to which first expansion color signal the limitation of a total amount of ink is applied; a device of creating a third table that defines a conversion relationship from a color signal in a device-independent color space corresponding to the signal of the second standard color in the first expansion color signal into a color signal in a device-dependent color space on the basis of a conversion relationship from a color signal in the device-dependent color space into a color signal in the device-independent color space, acquired by converting the second standard signal into the first expansion color signal using the second table to convert the first expansion color signal outputted according to the second table into a color signal in the device-independent color space corresponding to the first expansion color signal; and a device of creating a fourth table serving as a color profile that defines a conversion relationship from a color signal in the device-independent color space, corresponding to the signal of the second standard color, in the first expansion color signal, into a second expansion color signal including one or more kinds of signals of specific colors mixed with a plurality of signals of standard colors in the device-dependent color space, by using the conversion relationship defined by the third table, and the conversion relationship defined by the second table.

According to the tenth aspect, it is possible to acquire the same effect as that of the first aspect.

In the tenth aspect, there is a preferable aspect in which the device of creating a second table includes a device of creating a rule of substitution of a signal value of a specific color component that creates a rule of substituting a maximum value of signals of standard colors constituting the signal of the specific color with a maximum value of the signal of the specific color.

In the tenth aspect, there is a preferable aspect in which the device of creating a second table includes a device of acquiring a mixing ratio among the plurality of the signals of the standard colors that is to be substituted with the signal of the specific color, and the device of creating a rule of substitution of a signal value of a specific color component that creates a rule of substituting the plurality of the signals of the standard colors with the signal of the specific color on the basis of the mixing ratio acquired.

In the tenth aspect, there is a preferable aspect in which the device of creating a rule of substitution of a signal value of a specific color component creates a rule of substituting the plurality of the signals of the standard colors with the signal of the specific color by using the function f(S) for defining a substitution ratio of the plurality of the signals of the standard colors with respect to the chroma S.

In the tenth aspect, there is a preferable aspect in which the function f(S) becomes zero in a low chroma area equal to or less than predetermined chroma.

In the tenth aspect, there is a preferable aspect in which the device of creating a rule of substitution of a signal value of a specific color component creates a rule of substituting the plurality of the signals of the standard colors with the signal of the specific color by using the function g(H) for defining a substitution ratio of the plurality of the signals of the standard colors with respect to the hue H.

In the tenth aspect, there is a preferable aspect in which the function g(H) becomes one in an area not less than the predetermined first hue value and not more than the predetermined second hue value.

In the tenth aspect, there is a preferable aspect in which each of the signal of the first standard color and the signal of the second standard color is composed of the cyan signal expressing cyan, the magenta signal expressing magenta, the yellow signal expressing yellow, and the black signal expressing black.

In the tenth aspect, there is a preferable aspect that includes at least any one of the orange signal expressing orange, the green signal expressing green, and the violet signal expressing violet.

According to the presently disclosed subject matter, it is possible to create a color profile defining a conversion relationship from a device-independent color space in an expansion color signal including one or more kinds of specific colors into a device-dependent color space by using a conversion relationship from a device-independent color space in a signal of a standard color to which limitation of a total amount of ink is applied into a device-dependent color space, and a conversion relationship from a signal of a standard color, to which the limitation of a total amount of ink is applied, into an expansion color signal including one or more kinds of specific colors to which the limitation of a total amount of ink is applied, without performing complicated prediction calculation in an area where the limitation of a total amount of ink is not satisfied.

DETAILED DESCRIPTION OF THE EMBODIMENTS

Hereinafter, referring to accompanying drawings, a preferable embodiment of the presently disclosed subject matter will be described in detail.

(General Configuration)

Figure 1:
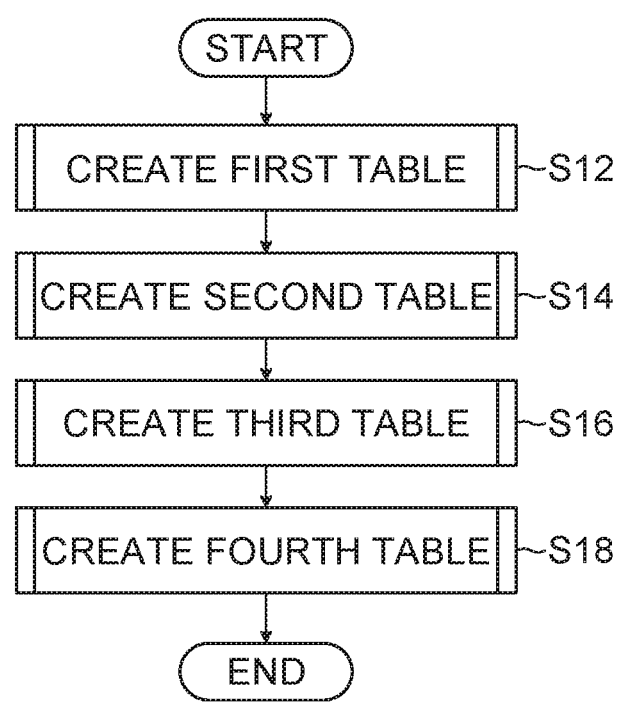
FIG. 1 is a flow chart illustrating a flow of a method for creating a color profile in accordance with an embodiment of the presently disclosed subject matter.

FIG. 1 is a flow chart illustrating a flow of a method for creating a color profile in accordance with an embodiment of the presently disclosed subject matter.

The present embodiment shows a method for creating a color profile that is to be applied to image formation by an ink-jet method, configured to be able to use ink of seven colors of cyan, magenta, yellow, and black, of which standard colors composed of three or more kinds of colors, and orange, green, and violet, being specific colors composed of one or more kinds of colors that can be acquired by mixing two or more kinds of ink of standard colors.

A color profile created by the method for creating a color profile shown in the present embodiment is applicable to image formation configured to be able to switch between a four-color mode of forming an image by receiving image data composed of a signal of each of the colors of cyan, magenta, yellow, and black, to form the image by using ink of each of the colors of cyan, magenta, yellow, and black, and a seven-color mode of forming an image by receiving image data composed of a signal of each of the colors of cyan, magenta, yellow, and black, to form the image by using ink of each of the colors of cyan, magenta, yellow, black, orange, green, and violet.

Even in a case of receiving image data composed of a signal of each of colors of red, green, and blue, instead of the image data composed of a signal of each of the colors of cyan, magenta, yellow, and black, shown in the present embodiment, the same idea is available. In the present specification, cyan, magenta, yellow, and black may be referred to as initial characters in English of C, M, Y, and K, respectively. In addition, cyan, magenta, yellow, and black may be referred to as CMYK in the block.

Orange, green, and violet may be referred to as initial characters in English of O, G, and V, respectively. In addition, orange, green, and violet may be referred to as OGV in the block. Further, cyan, magenta, yellow, black, orange, green, and violet may be referred to as CMYKOGV in the block.

Red, green, and blue may be referred to as initial characters in English of R, G, and B, respectively. In addition, red, green, and blue may be referred to as RGB in the block.

The standard color is a concept including CMYK in a CMYK method in which color is expressed by subtractive mixture using absorption of light by ink, in a printed matter, an image photographed by a digital camera or the like, and RGB in an RGB format, in which color is expressed by additive mixture using light emission from a light source, in a display of a personal computer, or the like.

The specific color can be acquired by mixing a plurality of arbitrary colors in the standard colors RGB in the RGB format, or can be acquired by mixing a plurality of arbitrary colors in the standard colors CMYK other than black in the CMYK method. A mixing ratio between colors to be mixed is determined depending on conditions of the specific color, such as color and brightness.

The present specification describes the following cases: orange that can be acquired by mixing magenta and yellow is used; green that can be acquired by mixing cyan and yellow is used; and violet that can be acquired by mixing cyan and magenta is used.

As illustrated in FIG. 1, the method for creating a color profile shown in the present embodiment includes step S12 of creating a first table, step S14 of creating a second table, step S16 of creating a third table, and step S18 of creating a fourth table.

That is, the present embodiment shows an aspect of creating a look-up table that defines a conversion relationship from a CMYK signal in a device-independent color space into a CMYKOGV signal in a device-dependent color space, as a color profile, for example. In the following description, the look-up table may be referred to as a table.

(Creation of First Table)

Figure 2:
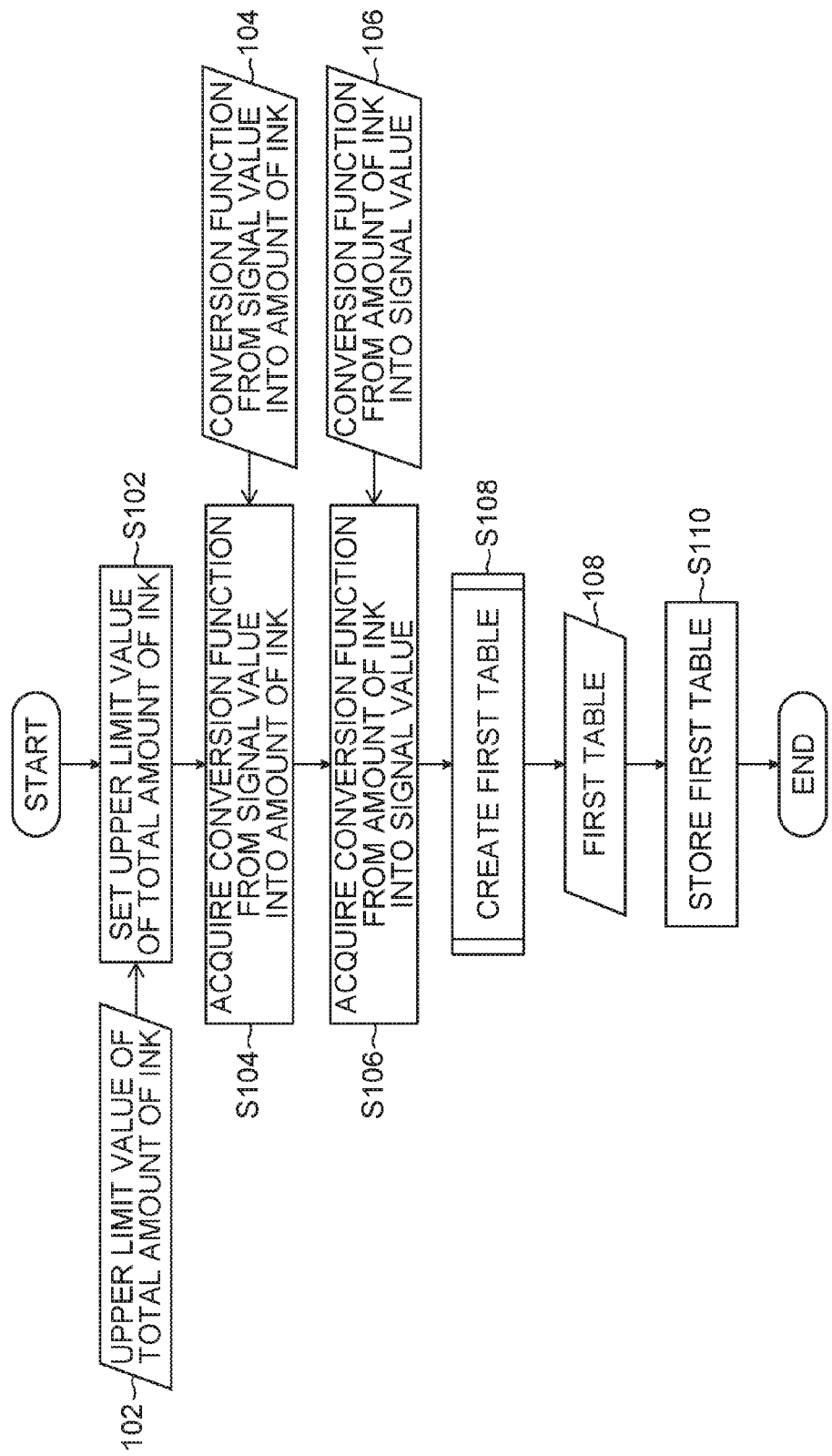
FIG. 2 is a flow chart illustrating a flow of a step of creating a first table.

FIG. 2 is a flow chart illustrating a flow of the step of creating the first table. The first table defines a conversion relationship from a CMYK signal, to which limitation of a total amount of ink is not applied, into a CMYK signal to which the limitation of a total amount of ink is applied.

The CMYK signal to which the limitation of a total amount of ink is not applied corresponds to a signal of a first standard color. The CMYK signal to which the limitation of a total amount of ink is applied corresponds to a signal of a second standard color to which the limitation of a total amount of ink is applied.

In FIG. 2, the same portion as that of FIG. 1 is designated by the same reference character and reference numeral to appropriately omit a description thereof. Also in FIG. 3 and later, the same portion as that of the configuration described before is designated by the same reference character and reference numeral to appropriately omit a description thereof.

As illustrated in FIG. 2, the first table is created by using an upper limit value 102 of a total amount of ink, a function 104 of converting a signal value into the amount of ink, and a function 106 of converting the amount of ink into a signal value.

The upper limit value 102 of a total amount of ink is predetermined on the basis of a kind of medium, a kind of ink, and the like.

The function 104 of converting a signal value into the amount of ink defines the amount of ink with respect to a signal value. For example, the amount of ink within a range from 0 picoliters to 5 picoliters is allocated to a signal value expressed in percentage within a range from 0 percent to 100 percent.

The function 106 of converting the amount of ink into a signal value defines a signal value with respect to the amount of ink. The function 106 of converting the amount of ink into a signal value and the function 104 of converting a signal value into the amount of ink have a relationship of forward conversion and reverse conversion.

Although the present embodiment shows an aspect in which a signal value of each color is expressed in percentage, for example, the signal value of each color may be expressed in an integer, a decimal fraction, or the like.

In step S108 of creating a first table, a first table 108 is created. The first table 108 is a four-dimensional conversion look-up table of converting a CMYK signal to which limitation of a total amount of ink is not applied into a CMYK signal to which the limitation of a total amount of ink is applied. In the following description, the CMYK signal to which the limitation of a total amount of ink is not applied may be referred to as a cyan signal C, a magenta signal M, a yellow signal Y, and a black signal K, and the CMYK signal to which the limitation of a total amount of ink is applied may be referred to as a cyan signal $C_1$, a magenta signal $M_1$, a yellow signal $Y_1$, and a black signal $K_1$.

An example of creating the first table 108 includes a method of determining a condition of a total amount of ink in the whole color reproduction area by allocating an upper limit value of a total amount of ink to divisions of the color reproduction area. When the first table 108 is created, the first table 108 is stored in step S110 of storing a first table.

(Creation of Second Table)

Figure 3:
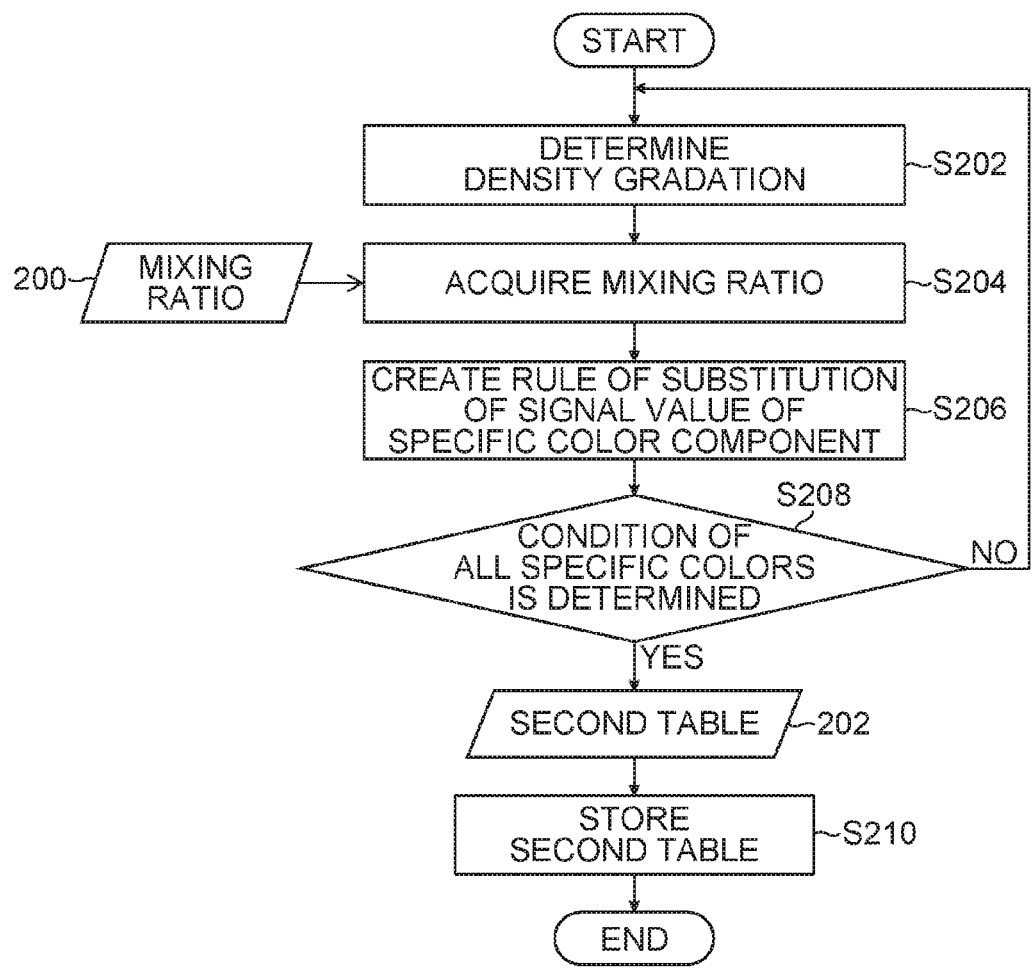
FIG. 3 is a flow chart illustrating a flow of a step of creating a second table.

FIG. 3 is a flow chart illustrating a flow of the step of creating a second table. A second table 202 is used to convert a CMYK signal to which limitation of a total amount of ink is applied into a CMYKOGV signal to which limitation of a total amount of ink is applied.

That is, the second table 202 defines a conversion relationship from the CMYK signal, to which the limitation of a total amount of ink is applied, into the CMYKOGV signal to which the limitation of a total amount of ink is applied, including specific colors.

The CMYKOGV signal to which the limitation of a total amount of ink is applied, including specific colors, is a first expansion color signal including one or more kinds of signals of specific colors in which a plurality of signals of standard colors are mixed, and corresponds to the first expansion signal to which limitation of a total amount of ink is applied.

Creating the second table 202 includes step S202 of determining density gradation, step S204 of acquiring a mixing ratio, step S206 of creating a rule of substitution of a specific color component, and step S210 of storing a second table.

In step S202 of determining density gradation, a relationship between a signal value and a density gradation value is defined for a specific color. In step S204 of acquiring a mixing ratio, a mixing ratio 200 between the specific color and standard colors constituting the specific color is acquired. The mixing ratio 200 is predetermined.

In step S206 of creating a rule of substitution of specific color components, a rule of substituting a specific color component with a signal value of the specific color is created.

In step S210 of storing a second table, the second table 202 created is stored.

In step S202 of determining density gradation illustrated in FIG. 3, a relationship between the signal value and the density gradation value in the specific color is determined.

Hereinafter, an orange signal will be described.

Figure 4:
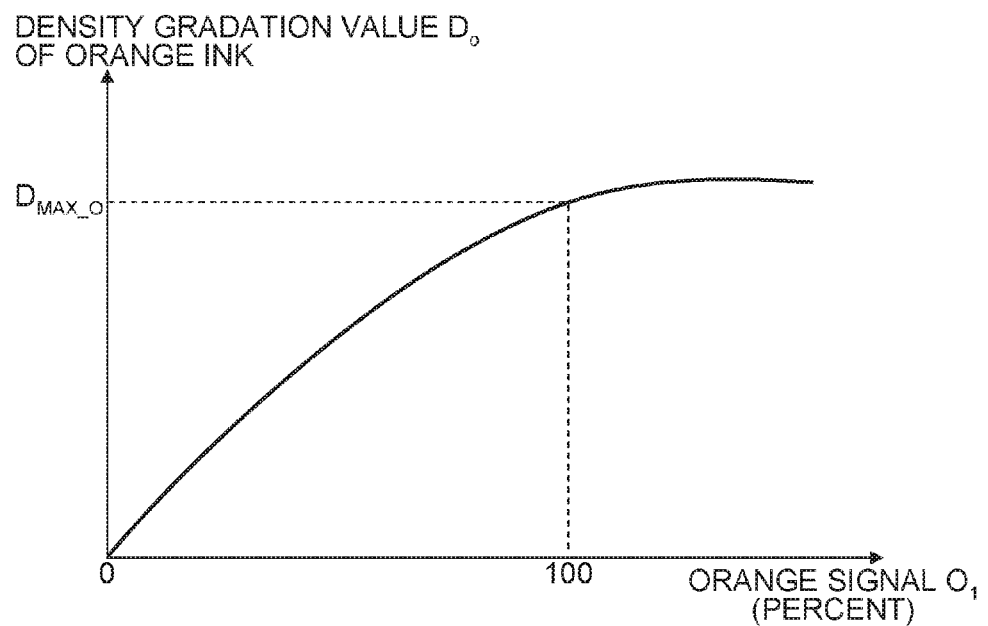
FIG. 4 is a graph illustrating a relationship between a signal value and a density gradation value.

FIG. 4 is a graph illustrating a relationship between an orange signal $O_1$ and a density gradation value $D_O$ of orange ink. FIG. 4 illustrates the orange signal $O_1$ in the horizontal axis. The orange signal $O_1$ is expressed in percentage within a range from 0 percent to 100 percent. FIG. 4 illustrates the density gradation value $D_O$ of the orange ink in the vertical axis. The density gradation value $D_O$ of the orange ink is expressed in a numeric value within a range from 0 to 255 in a case of 8-bit digital data.

$D_{MAX\_O}$ illustrated in FIG. 4 is a maximum density gradation value of the orange ink. The maximum density gradation value $D_{MAX\_O}$ of the orange ink is predetermined. As illustrated in FIG. 4, the orange signal $O_1$, at which an increase ratio of the density gradation value $D_O$ with respect to an increase of the orange signal $O_1$ sufficiently decreases to allow the density gradation value $D_O$ to increase little even if the orange signal $O_1$ increases in percentage, is set at 100 percent, and then the maximum density gradation value $D_{MAX\_O}$ is allocated to the orange signal $O_1$ at 100 percent.

While not illustrated, also with respect to green ink, a relationship between a green signal $G_1$ and a density gradation value $D_G$ of the green ink is determined as with the orange ink. In addition, also with respect to violet ink, a relationship between a violet signal $V_1$ and a density gradation value $D_V$ of the violet ink is determined as with the orange ink.

In step S204 of acquiring a mixing ratio illustrated in FIG. 3, a component ratio of a plurality of signals of standard colors constituting a signal of a specific color is acquired.

The component ratio of a plurality of signals of standard colors constituting a signal of a specific color is predetermined.

That is, the mixing ratio of the plurality of signals of the standard colors, at which the signal of the specific color and a mixed signal acquired by mixing the plurality of signal of standard colors constituting the signal of the specific color have the same hue, is acquired.

Figure 5:
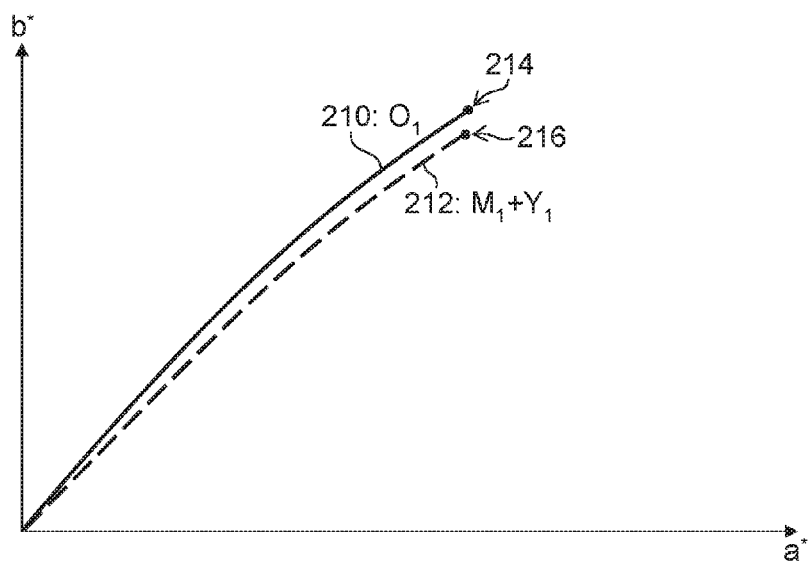
FIG. 5 is a graph illustrating a relationship between a signal of a standard color and a signal of a specific color in a device-independent color space.

FIG. 5 is a graph illustrating the orange signal $O_1$ in a device-independent color space, and a mixed color signal corresponding to the orange signal $O_1$. The mixed color signal corresponding to the orange signal $O_1$ is a mixed color signal composed of a magenta signal $M_1$, and a yellow signal $Y_1$. FIG. 5 illustrates an a*-b* plane in an L*a*b* color space. A direction penetrating a paper-surface in FIG. 5 is an L direction in the L*a*b* color space.

The L*a*b* color space is a kind of complementary color space, and has a dimension L*, and complementary color dimensions a* and b*, expressing brightness. The dimensions L* of 0 and 100 express diffuse colors of black and white, respectively. The complementary color dimension a* expresses a position between red or magenta, and green.

A negative value of the complementary color dimension a* corresponds to a position close to green, and a positive value of the complementary color dimension a* corresponds to a position close to red or magenta. The complementary color dimension b* expresses a position between yellow and blue. A negative value of the complementary color dimension b* corresponds to a position close to blue, and a positive value of the complementary color dimension b* corresponds to a position close to yellow.

Although FIG. 5 illustrates the a*-b* plane in the L*a*b* color space, for example, an XYZ color space may be available. In the following description, coordinates in the L*a*b*color space are referred to as an Lab-value, or an L-value, an a-value, and a b-value.

A curve illustrated by a solid line, designated by a reference numeral 210 in FIG. 5, is a locus of the orange signal $O_1$ on the a*-b* plane. A curve illustrated by a broken line, designated by a reference numeral 212 in FIG. 5, is a locus of a mixed color signal of the magenta signal $M_1$ and the yellow signal $Y_1$, corresponding to the locus of the orange signal $O_1$ on the a*-b* plane.

In FIG. 5, a maximum value of the orange signal $O_1$ is designated by a reference numeral 214, corresponding to the maximum density gradation value $D_{MAX\_O}$ of orange. In addition, in FIG. 5, a maximum value of the mixed color signal of the magenta signal $M_1$ and the yellow signal $Y_1$ is designated by a reference numeral 216.

A mixing ratio of the magenta signal and the yellow signal in the mixed color signal of the magenta signal and the yellow signal, at which hue of the mixed color signal becomes the same as that of the orange signal, is defined as an orange component. Likewise, a mixing ratio of the cyan signal and the yellow signal, at which hue of a mixed color signal thereof becomes the same as that of the green signal, is defined as a green component. In addition, a mixing ratio of the cyan signal and the magenta signal, at which hue of a mixed color signal thereof becomes the same as that of the violet signal, is defined as a violet component.

In the following description, the orange component, the green component, and the violet component, may be collectively referred to as a specific color component.

In step S206 of creating a rule of substitution of a specific color component illustrated in FIG. 3, a substitution rule of a signal of a specific color and a signal of standard colors to be substituted with the signal of the specific color is created on the basis of a predetermined specific color component.

That is, in step S206 of creating a rule of substitution of a specific color component, there is determined a relationship between a total amount of a plurality of kinds of ink of standard colors, determined on the basis of the specific color component, and the amount of ink of the specific color, when ink of the specific color is substituted with ink of the standard colors.

Figure 6:
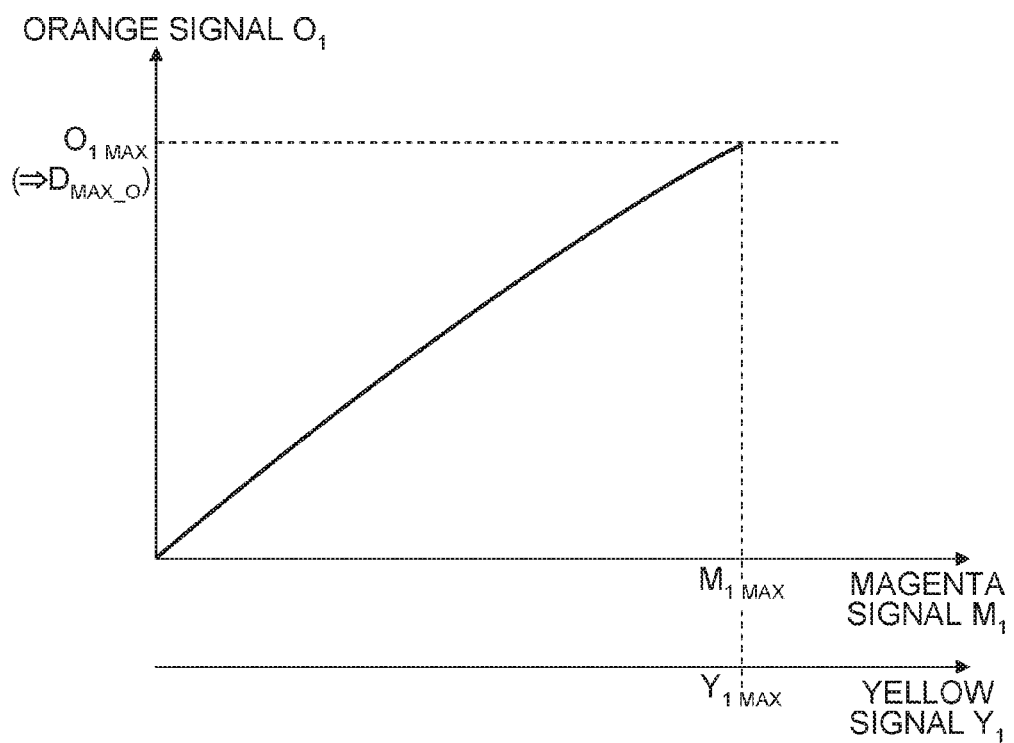
FIG. 6 is a graph illustrating substitution of a signal value of specific color component.

FIG. 6 is a graph illustrating substitution of a signal value of a specific color component. FIG. 6 illustrates a signal value of standard colors to be substituted for a signal value of a specific color in the horizontal axis. Then, FIG. 6 illustrates the magenta signal $M_1$ on an upper side, and the yellow signal $Y_1$ on a lower side. In addition, FIG. 6 illustrates a signal value of the specific color in the vertical axis, and then illustrates the orange signal $O_1$.

A maximum value of the orange signal $O_1$ corresponding to a maximum value $M_{1MAX}$ of the magenta signal $M_1$ and a maximum value $Y_{1MAX}$ of the yellow signal $Y_1$ is referred to as a maximum value $O_{1MAX}$. The maximum value $O_{1MAX}$ of the orange signal $O_1$ corresponds to the maximum density gradation value $D_{MAX\_O}$ of the density gradation value $D_O$ of orange ink illustrated in FIG. 4.

While not illustrated, in step S206 of creating a rule of substitution of a specific color component illustrated in FIG. 3, a relationship of substitution of the cyan signal value $C_1$ and the yellow signal $Y_1$ for the green signal $G_1$, is determined. In addition, a rule of substitution of the cyan signal value $C_1$ and the magenta signal $M_1$ for the violet signal $V_1$, is created.

In step S206 of creating a rule of substitution of a specific color component, it is unnecessary to create a rule of substitution of storing a mixed color of ink of standard colors when ink of standard colors is substituted for ink of a specific color, and thus a rule of substitution of a signal of the standard colors and a signal of the specific color may be created so that the following conversion relationship holds: a maximum value of a total amount of ink of the standard colors to which limitation of a total amount of ink is applied is allocated to a maximum density value of ink of the specific color to which limitation of a total amount of ink is applied.

That is, a maximum value 216 of the mixed color signal of the magenta signal $M_1$ and the yellow signal $Y_1$ illustrated in FIG. 5 may be allocated to the maximum density gradation value $D_{MAX\_O}$ of the orange ink illustrated in FIG. 4 corresponding to a maximum value 214 of the orange signal $O_1$ illustrated in FIG. 5.

A specific color acquired by using ink of a specific color can reproduce thick and clear color as compared with specific colors acquired by mixing two or more kinds of ink of standard colors. If a maximum value of a total amount of two or more kinds of ink of the standard colors is allocated to a maximum density value of ink of the specific color to substitute the two or more kinds of ink of the standard colors with the ink of the specific color, a color reproduction area of the ink of the specific color is maximally available.

It is preferable that the substitution of a signal of a specific color for a signal of standard colors satisfies an expression (1) below. In the expression (1), the orange signal $O_1$ is defined as a function of chroma S and hue H.

$$O_1(S,H,M_1,Y_1)=f(S)\times g(H)\times h(M_1,Y_1) \qquad (1)$$

In the expression (1), f(S) is a function in which the chroma S serves as a parameter to express a substitution ratio for the magenta signal $M_1$ and the yellow signal $Y_1$, and also g(H) is a function in which the hue H serves as a parameter to express a substitution ratio for the magenta signal $M_1$ and the yellow signal $Y_1$.

In addition, $h(M_1,Y_1)$ is a function that expresses the amount of substitution of the orange signal $O_1$ for the magenta signal $M_1$ and the yellow signal $Y_1$.

The substitution condition shown in the expression (1) is an example, and thus an aspect of changing a substitution ratio in accordance with an L value expressing brightness is also available. That is, if a function in which the L value serves as a parameter to express a substitution ratio for the magenta signal $M_1$ and the yellow signal $Y_1$ is defined, a substitution condition using the function is available.

Figure 7:
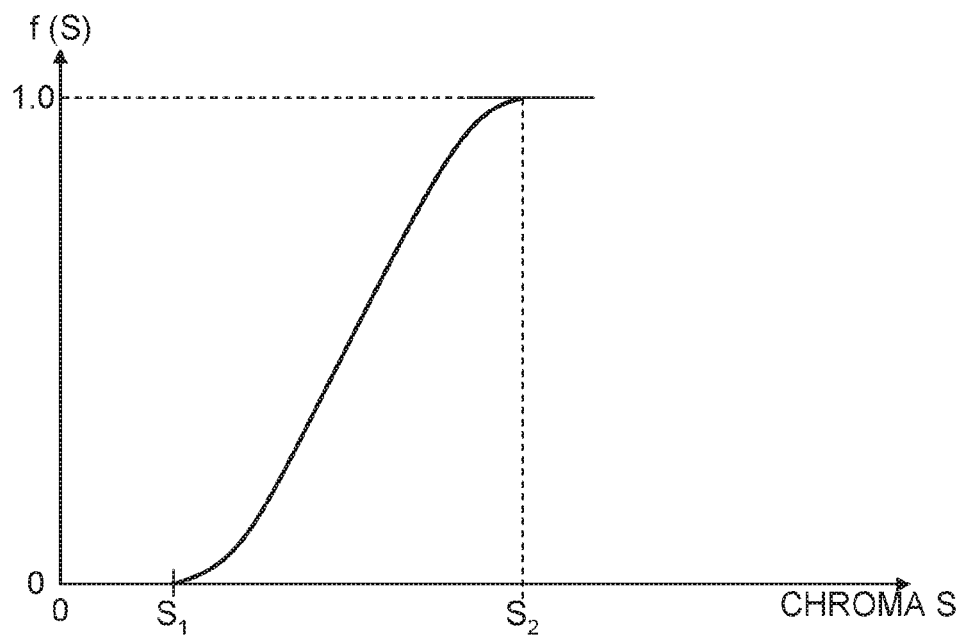
FIG. 7 is a graph illustrating a function in which chroma serves as a parameter to express a substitution ratio of an orange signal for a magenta signal value and a yellow signal value.

FIG. 7 is a graph illustrating a function in which chroma S serves as a parameter to express a substitution ratio of an orange signal $O_1$ for a magenta signal $M_1$ and a yellow signal $Y_1$. FIG. 7 illustrates the chroma S in the horizontal axis, and illustrates the function f(S) in the vertical axis.

As illustrated in FIG. 7, if the chroma S is 0 or more and $S_1$ or less, or in a low chroma area with predetermined chroma or less, a substitution ratio f(S) is set at 0 so that the magenta signal $M_1$ and the yellow signal $Y_1$ are not substituted with the orange signal $O_1$, whereby a mixed color signal of the magenta signal $M_1$ and the yellow signal $Y_1$ is used for orange.

If a chroma value is more than $S_1$ and less than $S_2$, the substitution ratio f(S) increases as the chroma S increases. In a high chroma area where a chroma value is more than $S_3$, the substitution ratio f(S) is set at 1 so that only the orange signal $O_1$ is used.

That is, in a high chroma area with a relatively high value of the chroma S, orange ink is used so that high color reproducibility of the orange ink of ink of a specific color is available. On the other hand, in a low chroma area with a relatively low value of the chroma S, or in an intermediate gradation area, magenta ink and yellow ink are used to enable intermediate gradation to be reproduced by using color balance of color representation by a combination of ink of standard colors. As a result, if the intermediate gradation is required to be corrected, adjustment of the magenta ink and the yellow ink enables the intermediate gradation to be corrected, thereby improving operability in the adjustment.

Figure 8:
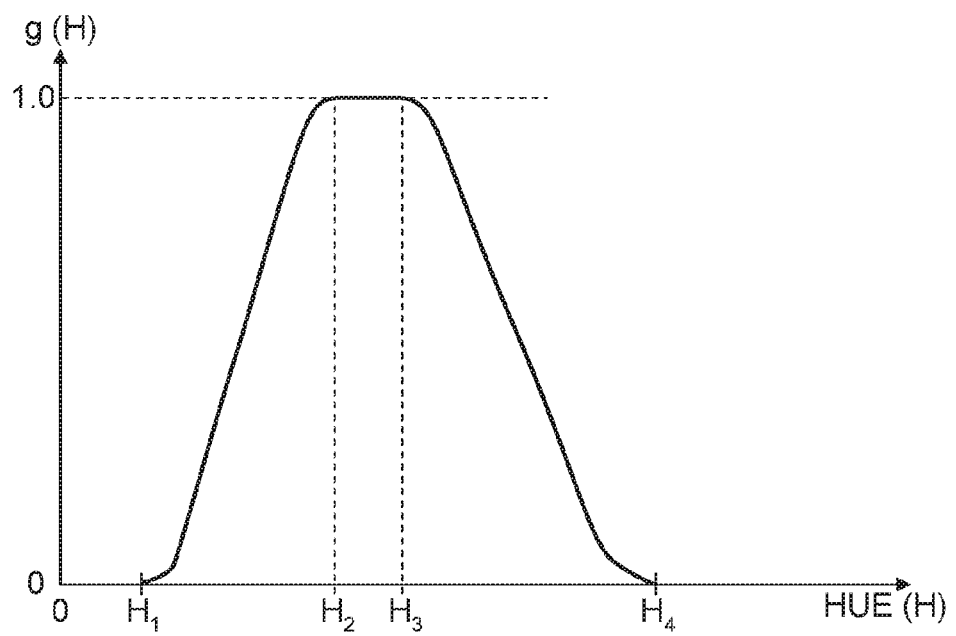
FIG. 8 is a graph illustrating a function in which hue serves as a parameter to express a substitution ratio of an orange signal for a magenta signal value and a yellow signal value.

FIG. 8 is a graph illustrating a function in which hue serves as a parameter to express a substitution ratio of an orange signal for the magenta signal $M_1$ and the yellow signal $Y_1$. FIG. 8 illustrates the hue H in the horizontal axis, and illustrates the function g(H) in the vertical axis.

In an example illustrated in FIG. 8, if the hue H is 0 or more and less than $H_1$, the substitution ratio g(H) is set at 0 so that the magenta ink and the yellow ink are not substituted with the orange ink, whereby the magenta ink and the yellow ink are used for orange.

If a value of hue is $H_1$ or more and less than $H_2$, the substitution ratio g(H) increases as a value of the hue H increases. If the value of hue is $H_2$ or more and $H_3$ or less, or is a first hue value or more and a second hue value or less, the substitution ratio g(H) is set at 1 so that only the orange ink is used. If the value of hue is more than $H_3$ and $H_4$ or less, the substitution ratio g(H) decreases as the value of the hue H increases. If the value of hue is more than $H_4$, the substitution ratio g(H) is set at 0 so that the magenta ink and the yellow ink are not substituted with the orange ink, whereby the magenta ink and the yellow ink are used.

If ink of standard colors is substituted with ink of a specific color, two colors are substituted with ink for one color, whereby generally the substitution of ink causes no increase in a total amount of ink. However, if a total amount of the orange ink exceeds a total amount of the magenta ink and the yellow ink, it is checked whether the total amount of ink when the orange ink is used exceeds an upper limit value of the total amount of ink or not.

If the total amount of ink when the orange ink is used exceeds the upper limit value of the total amount of ink, a part of the orange ink is restored to the magenta ink and the yellow ink so that a signal value of each color is determined within a range where the total amount of ink does not exceed the upper limit value of a total amount of ink.

Although the orange ink is described above, the same applies to green ink and violet ink.

The function f(S) and the function g(H), shown in the expression (1), can be appropriately omitted. That is, step S206 of creating a rule of substitution of a specific color component includes a step of acquiring a substitution ratio expressed by the function f(S) and the function g(H), shown in the expression (1).

(Creation of Third Table)

Figure 9:
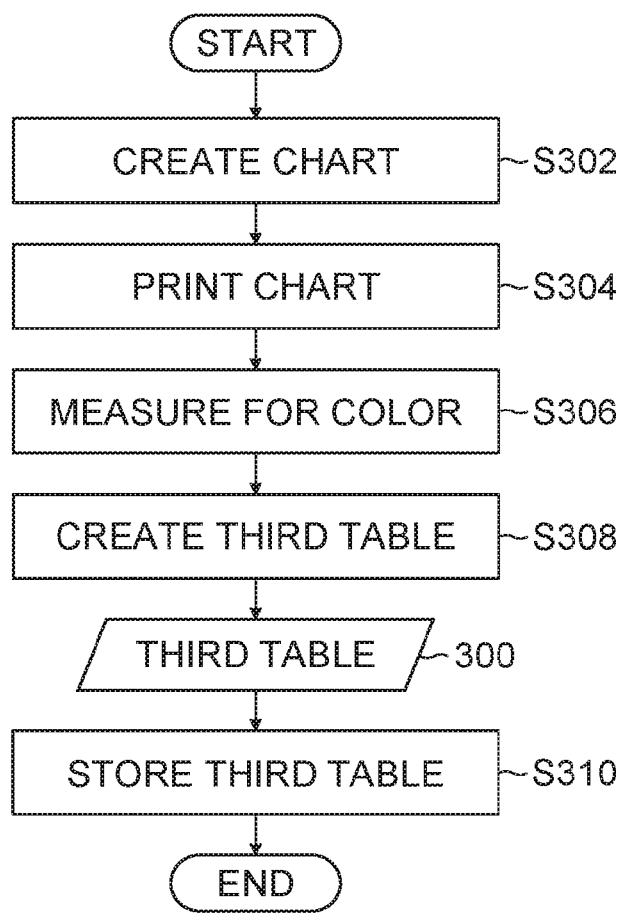
FIG. 9 is a flow chart illustrating a flow of a step of creating a third table.

FIG. 9 is a flow chart illustrating a flow of a step of creating a third table. A third table 300 defines a conversion relationship from a color signal in a device-independent color space corresponding to a CMYK signal to which limitation of a total amount of ink is applied, to a CMYK signal that is a color signal in a device-dependent color space.

The color signal in the device-independent color space corresponding to the CMYK signal to which the limitation of a total amount of ink is applied corresponds to a color signal in a device-independent color space corresponding to a signal of a second standard color in the first expansion color signal.

First, in step S302 of creating a chart, a CMYKOGV chart to which limitation of a total amount of ink is applied is created. The CMYKOGV chart to which the limitation of a total amount of ink is applied is composed of about 1000 to 2000 color patches.

A color shown by each of the color patches corresponds to discrete coordinates in a CMYKOGV color space. For example, if six grid points are set for each axis of CMYKOGV, 1512 ($6^4+6^3$) patches are created.

In the present embodiment, the CMYKOGV chart to which the limitation of a total amount of ink is applied is created by using a CMYK chart corresponding to the CMYK signal to which the limitation of a total amount of ink is applied, and the second table 202 illustrated in FIG. 3.

Next, in step S304 of printing a chart, the CMYKOGV chart to which the limitation of a total amount of ink is applied is printed. The printed CMYKOGV chart to which the limitation of a total amount of ink is applied is measured for color in step S306 of measuring for color.

The printed CMYKOGV chart is measured for color by using a colorimeter, such as a spectrophotometer. A measurement value of the colorimeter is converted into a chromaticity value. The chromaticity value includes an Lab value in an L*a*b* color space, and an Lab value in an Lab color space, for example.

That is, in step S306 of measuring for color, a chromaticity value expressed by each of the patches in the CMYKOGV chart is acquired.

In step S308 of creating a third table, first, a forward conversion table showing a conversion relationship from the CMYKOGV signal expressed by each of the patches of the CMYKOGV chart into the Lab value is created. Then, the third table showing a conversion relationship from the Lab value to the CMYK signal is created from a conversion relationship from the CMYK signal expressed by each of the patches of the CMYK chart into the Lab value by using reverse conversion calculation.

The reverse conversion calculation acquires the CMYK signal that is output from the third table, and that corresponds to a combination of a discrete Lab value that is input into the third table, by using search calculation. The search calculation determines a restricting condition, such as establishing a relationship of a black signal $K_1$ with respect to the L value.

The reverse conversion calculation acquires a four-dimensional CMYK signal from a three-dimensional Lab value. If red, green, and blue are applied as standard colors, a three-dimensional RGB signal value is acquired from the three-dimensional Lab value.

That is, the third table 300 illustrated in FIG. 9 is a color profile that defines a conversion relationship from a Lab value in the L*a*b* color space into a CMYK signal in a CMYK color space.

When the third table 300 is created in step S308 of creating a third table, the third table 300 is stored in step S310 of storing a third table, and then step S16 of creating a third table, illustrated in FIG. 1, is finished.

(Creation of Fourth Table)

Figure 10:
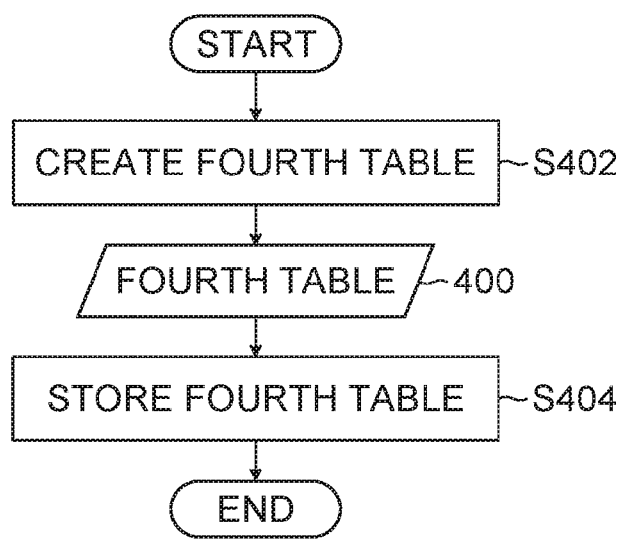
FIG. 10 is a flow chart illustrating a flow of step of creating a fourth table.

FIG. 10 is a flow chart illustrating a flow of a step of creating a fourth table. When step S18 of creating a fourth table, illustrated in FIG. 1, is started, the fourth table is created in step S402 of creating a fourth table, the fourth table being a color profile that defines a conversion relationship from an Lab value into a CMYKOGV signal by using the conversion relationship from the Lab value into the CMYK signal, defined by the third table 300 illustrated in FIG. 9, and the conversion relationship from the CMYK signal into the CMYKOGV signal, defined by the second table 202 illustrated in FIG. 3.

For example, the fourth table 400 is created by combining the third table 300 illustrated in FIG. 9 and the second table 202 illustrated in FIG. 3.

When the fourth table 400 is created in step S402 of creating a fourth table, the fourth table 400 is stored in step S404 of storing a fourth table, and then step S18 of creating a fourth table, illustrated in FIG. 1, is finished.

The Lab value corresponds to a color signal in the device-independent color space corresponding to the signal of the second standard color in the first expansion color signal.

The third table showing the conversion relationship from the Lab value into the CMYK signal corresponds to the fourth table that is a color profile that defines a conversion relationship from the color signal in the device-independent color space corresponding to the signal of the second standard color in the first expansion color signal into a second expansion color signal in a device-dependent color space.

According to the method for creating a color profile configured as described above, by using the third table and the second table, the third table defining the conversion relationship from a signal value in a device-independent color space into a signal value in a device-dependent color space, and the second table defining the conversion relationship from a CMYK signal, to which limitation of a total amount of ink is applied, into a CMYKOGV signal, to which limitation of a total amount of ink is applied, the fourth table is created, the fourth table defining the conversion relationship from a Lab value in a device-independent color space corresponding to a CMYK signal, to which the limitation of a total amount of ink is applied, into a CMYKOGV signal, to which the limitation of a total amount of ink is applied, in a device-dependent color space. As a result, when a color profile is created for the CMYKOGV signal to which the limitation of a total amount of ink is applied, it is unnecessary to perform complicated calculation of predicting Lab in an area where the limitation of a total amount of ink is not satisfied.

(Description of System of Creating Color Profile)

Next, a system of creating a color profile, to which the method for creating a color profile described with reference to FIGS. 1 to 10 is applied, will be described.

(General Configuration)

Figure 11:
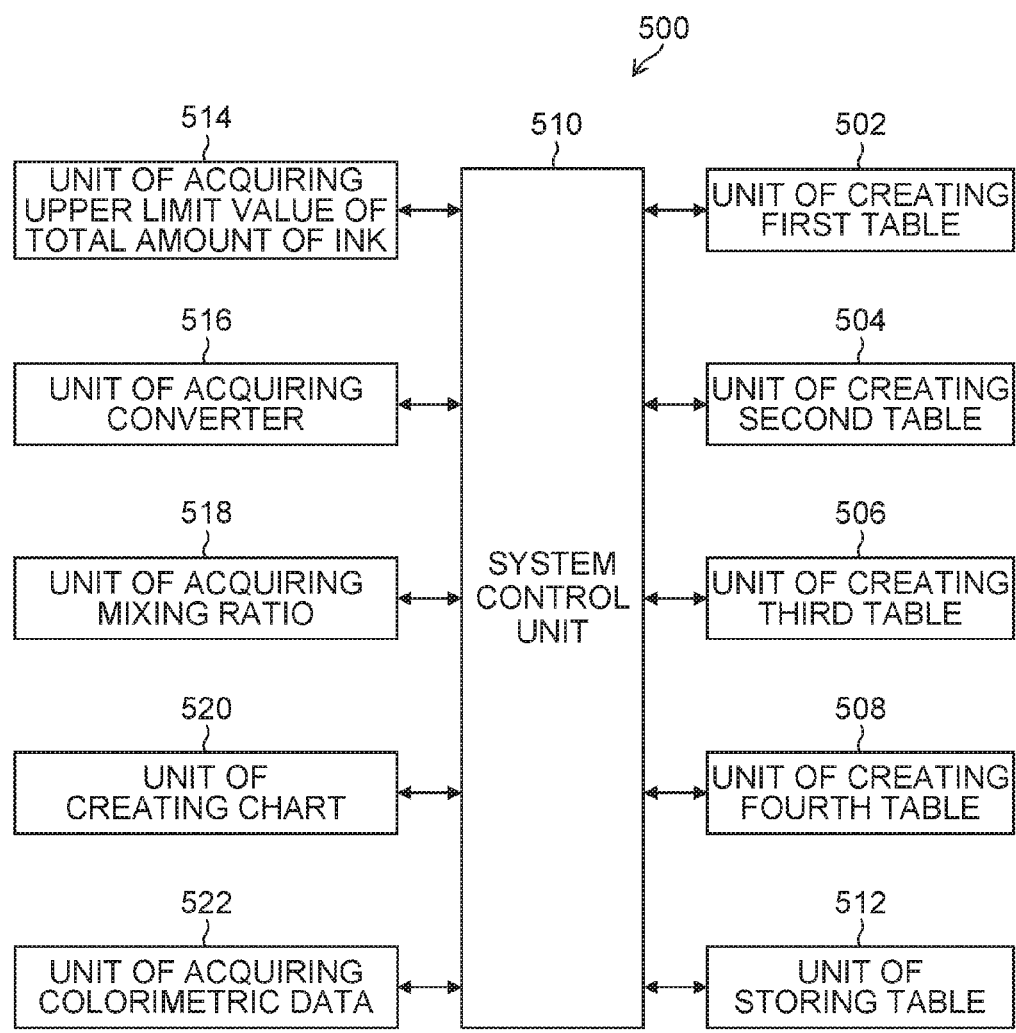
FIG. 11 is a general structural view of a system of creating a color profile.

FIG. 11 is a general structural view of the system of creating a color profile. A system 500 of creating a color profile illustrated in FIG. 11 includes a unit 502 of creating a first table, serving as a device of creating a first table, corresponding to step S12 of creating a first table illustrated in FIG. 1.

The system 500 of creating a color profile illustrated in FIG. 11 includes a unit 504 of creating a second table, serving as a device of creating a second table, corresponding to step S14 of creating a second table illustrated in FIG. 1.

The system 500 of creating a color profile illustrated in FIG. 11 further includes a unit 506 of creating a third table, serving as a device of creating a third table, corresponding to step S16 of creating a third table illustrated in FIG. 1.

Further, the system 500 of creating a color profile illustrated in FIG. 11 includes a unit 508 of creating a fourth table, serving as a device of creating a fourth table, corresponding to step S18 of creating a fourth table illustrated in FIG. 1.

Furthermore, the system 500 of creating a color profile illustrated in FIG. 11 includes a system control unit 510 that integrally controls each unit of the system, and a unit 512 of storing a table. The unit 512 of storing a table illustrated in FIG. 11 stores the first table 108 illustrated in FIG. 2, the second table 202 illustrated in FIG. 3, the third table 300 illustrated in FIG. 9, and the fourth table 400 illustrated in FIG. 10.

The unit 512 of storing a table may be composed of a first table storage unit that stores the first table 108 illustrated in FIG. 2, a second table storage unit that stores the second table 202 illustrated in FIG. 3, a third table storage unit that stores the third table 300 illustrated in FIG. 9, and a fourth table storage unit that stores the fourth table 400 illustrated in FIG. 10.

A unit 514 of acquiring an upper limit value of a total amount of ink, illustrated in FIG. 11, acquires an upper limit value of a total amount of ink to be used in the unit 502 of creating a first table. A unit of storing an upper limit value of a total amount of ink, which stores the acquired upper limit value of a total amount of ink, may be provided.

A unit 516 of acquiring a converter acquires a converter 104 from a signal value into the amount of ink, and a converter 106 from the amount of ink into a signal value, to be used in the unit 502 of creating a first table. The converter 104 from a signal value into the amount of ink and the converter 106 from the amount of ink into a signal value are illustrated in FIG. 2.

The system 500 of creating a color profile illustrated in FIG. 11 may include a unit of storing a converter, in which the converter 104 from a signal value into the amount of ink and the converter 106 from the amount of ink into a signal value are to be stored.

A unit 518 of acquiring a mixing ratio acquires the mixing ratio 200 illustrated in FIG. 3. A unit of storing a mixing ratio may be provided to store the mixing ratio 200 acquired.

A unit 520 of creating a chart creates a chart composed of a patch corresponding to a CMYKOGV signal to which limitation of a total amount of ink is applied, with reference to the second table 202 stored in the unit 512 of storing a table illustrated in FIG. 11.

A unit 522 of acquiring colorimetric data acquires a Lab value of each of patches constituting a chart to be used in the unit 506 of creating a third table, as colorimetric data. The colorimetric data includes an Lab value corresponding to the CMYKOGV signal.

(Description of Unit of Creating First Table)

Figure 12:
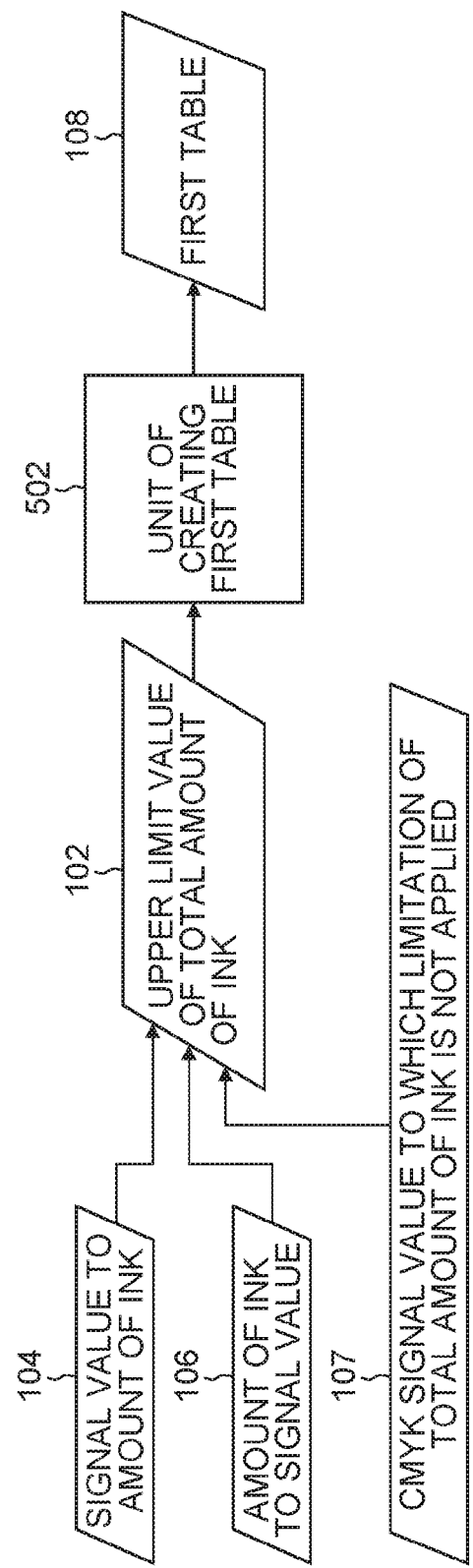
FIG. 12 is a diagram of a unit of creating a first table.

FIG. 12 is a diagram of the unit 502 of creating a first table, illustrated in FIG. 11. The unit 502 of creating a first table creates the first table 108 that defines a conversion relationship for converting a CMYK signal 107, to which limitation of a total amount of ink is not applied, into a CMYK signal, to which the limitation of a total amount of ink is applied, by using the upper limit value 102 of a total amount of ink, the converter 104 from a signal value into the amount of ink, and the converter 106 from the amount of ink into a signal value.

(Description of Unit of Creating Second Table)

Figure 13:
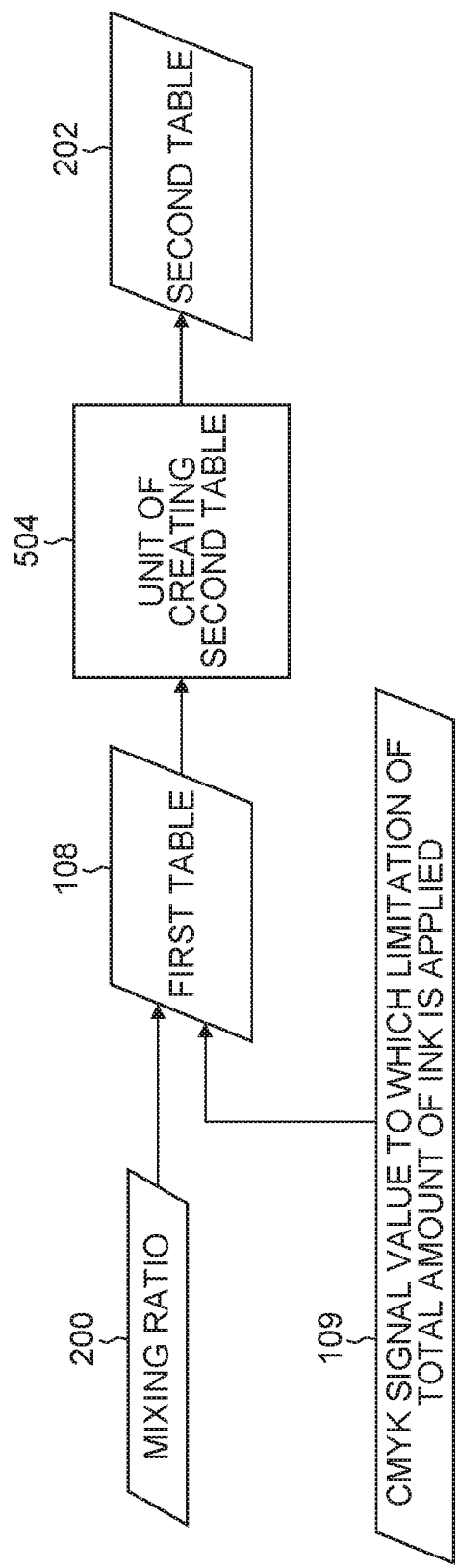
FIG. 13 is a diagram of a unit of creating a second table.

FIG. 13 is a diagram of the unit 504 of creating a second table, illustrated in FIG. 11. The unit 504 of creating a second table creates the second table 202 that defines a conversion relationship for converting a CMYK signal 109, to which limitation of a total amount of ink is applied, into an OGV signal, to which limitation of a total amount of ink is applied, by using the first table 108, and the mixing ratio 200.

The unit 504 of creating a second table is capable of referring to the magenta signal $M_1$ in which the chroma S serves as a parameter, and the function f(S) expressing a substitution ratio for the yellow signal $Y_1$, the function g(H) expressing a substitution ratio for the magenta signal $M_1$ and the yellow signal $Y_1$ in which the hue H serves as a parameter, and the function h $(M_1,Y_1)$ expressing the amount of substitution of the orange signal $O_1$ for the magenta signal $M_1$ and the yellow signal $Y_1$.

(Description of Unit of Creating Third Table)

Figure 14:
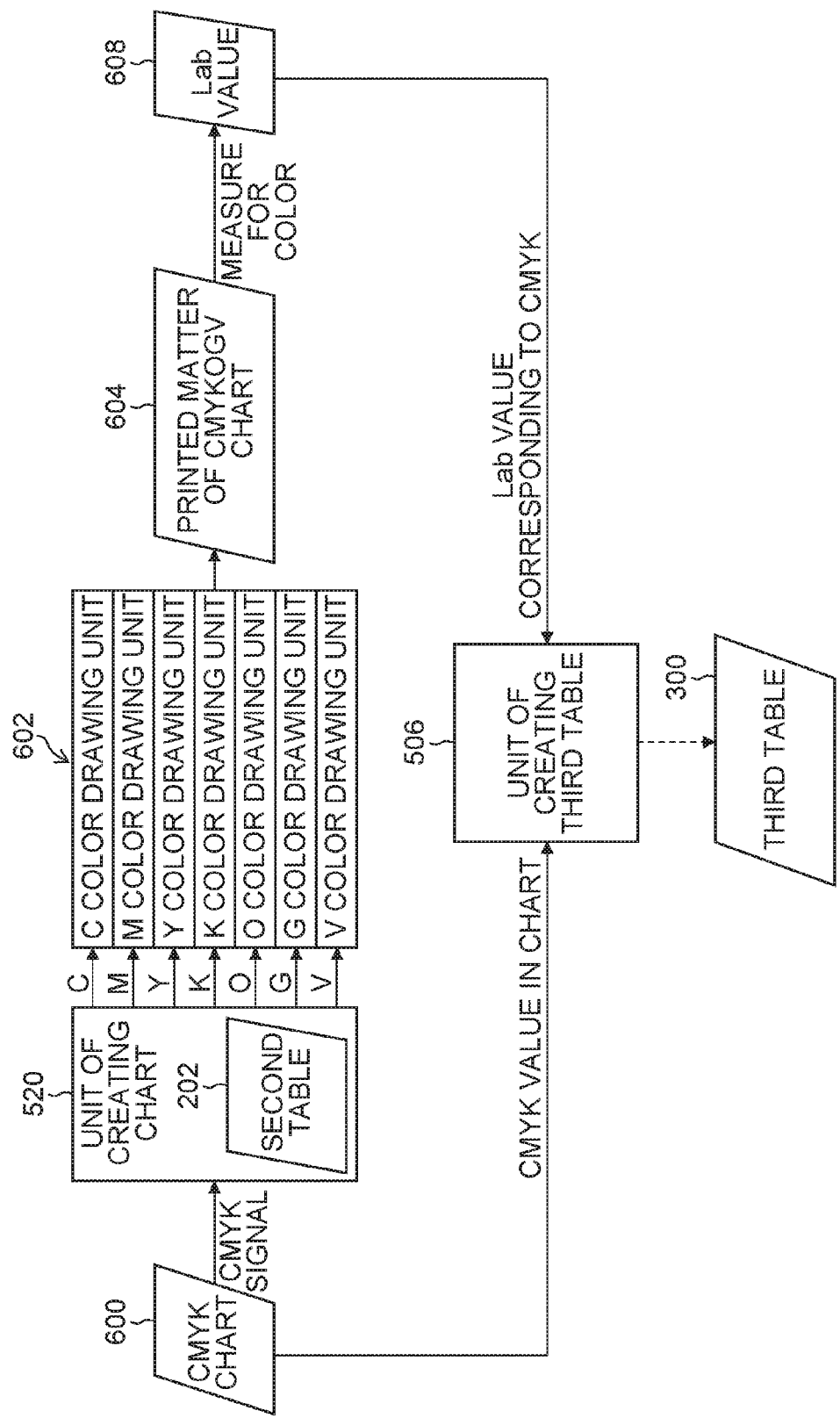
FIG. 14 is a diagram of a unit of creating a third table.

FIG. 14 is a diagram of the unit 506 of creating a third table, illustrated in FIG. 11. The unit 506 of creating a third table creates a third table that defines a conversion relationship from an Lab value into a CMYK signal.

The third table 300 is created by using a CMYKOGV signal shown by a CMYKOGV chart of a colorimetric target, and an Lab value acquired by measuring the CMYKOGV chart for color.

The CMYKOGV chart of a colorimetric target is created in the unit 520 of creating a chart by using a previously created CMYK chart 600. The second table 202 is used when the CMYKOGV chart is created by using the CMYK chart 600.

A drawing unit 602 including a drawing section of each color of CMYKOGV draws a printed matter 604 of the CMYKOGV chart. The printed matter 604 of the CMYKOGV chart is measured for color so that a Lab value 608 corresponding to the CMYKOGV chart is acquired.

Then, the third table 300 that defines a conversion relationship from the Lab value corresponding to the CMYK chart 600 into a CMYK signal is created.

(Description of Unit of Creating Fourth Table)

Figure 15:
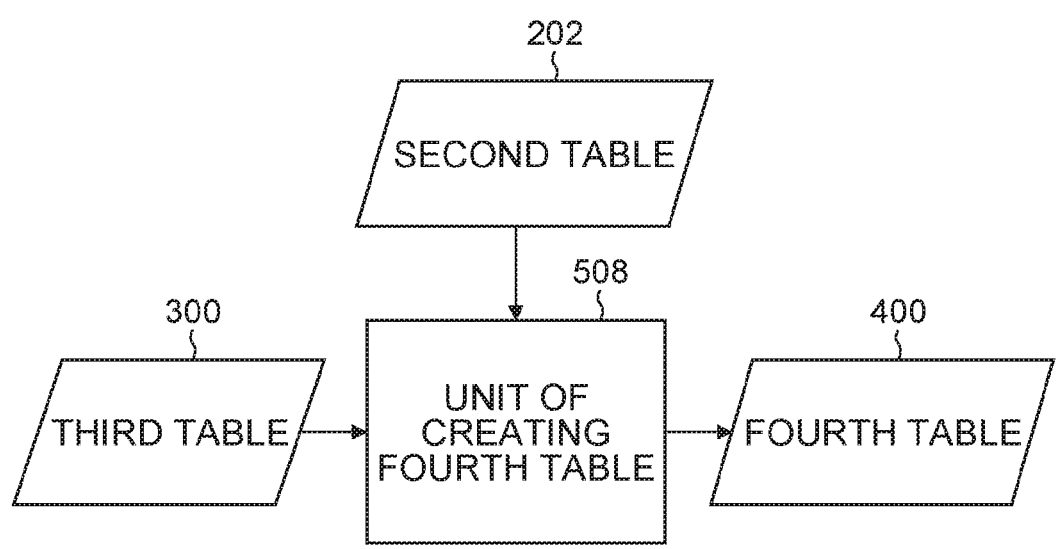
FIG. 15 is a diagram of a unit of creating a fourth table.

FIG. 15 is a diagram of a unit of creating a fourth table, illustrated in FIG. 11. The unit 508 of creating a fourth table combines the third table 300 that defines the conversion relationship from the Lab value into the CMYK signal with the second table 202 that defines the conversion relationship from the CMYK signal into the OGV signal to create the fourth table 400 that defines a conversion relationship from an Lab value into a CMYKOGV signal.

The system of creating a color profile, described above, can be provided by using hardware constituting a computer. For the following illustrated in FIG. 11: the unit 502 of creating a first table; the unit 504 of creating a second table; the unit 506 of creating a third table; the unit 508 of creating a fourth table; the system control unit 510; and the unit 520 of creating a chart, an arithmetic unit for performing various kinds of calculation is available.

For the unit 512 of storing a table, a storage device for storing various kinds of information is available. For the following: the unit 514 of acquiring an upper limit value of a total amount of ink; the unit 516 of acquiring a converter; the unit 518 of acquiring a mixing ratio; and the unit 522 of acquiring colorimetric data, an input-output device for managing input-output of data is available.

(Description of Program of Creating Color Profile)

It is possible to configure a program for creating a color profile, corresponding to the method for creating a color profile, described with reference to FIGS. 1 to 10, and the system of creating a color profile, illustrated in FIG. 11.

That is, it is possible to configure a program for creating a color profile, the program allowing a computer to serve as: the unit 502 of creating a first table, serving as a device of creating a first table; the unit 504 of creating a second table, serving as a device of creating a second table; the unit 506 of creating a third table, serving as a device of creating a third table; and the unit 508 of creating a fourth table, serving as a device of creating a fourth table.

(Example of Application to ICC Profile)

An ICC profile is a form of a profile of an international standard, and mainly includes a look-up table A2B that is used for conversion from a signal in a device-dependent color space into a signal in a device-independent color space, and a look-up table B2A that is used for conversion from a signal in a device-independent color space into a signal in a device-dependent color space.

If the look-up tables A2B and B2A are applied as a look-up table used for converting a CMYK signal into an Lab value and the fourth table used for converting an Lab value into a CMYKOGV signal, respectively, there is the following advantage.

In a case of creating page data for printing, particularly, in a field of print on a package to be used for packaging merchandise, ink of a specific color, such as orange ink, green ink, and violet ink, may be used in an area to be printed with high density and in a single color for brilliant color in a package, such as a background area and a logo area.

Meanwhile, in an area to be mainly printed with intermediate density or in a mixed color, such as a photograph area and an illustration area, CMYK ink or RGB ink of ink of a standard color is used.

In a case of printing an image in which an area to be printed with high density and in a single color, such as a background area and a logo area, and an area to be mainly printed with intermediate density or in a mixed color, such as a photograph area and an illustration area, are mixed, ink of a specific color is used in the area to be printed with high density and in a single color, such as the background area and the logo area, and ink of a standard color is used in the area to be mainly printed with intermediate density or in a mixed color, such as the photograph area and the illustration area, thereby facilitating correction of color if there is a difference between a color in a printed matter and a color sample.

In an area where ink of a standard color is used, it is possible to use a correction technique of a signal of a standard color, such as a correction technique using a tone curve, as it is. In contrast, in an area where ink of a specific color is used, it is difficult to use the correction technique of a signal of a standard color, such as the correction technique using a tone curve, as it is, whereby it is difficult to correct color.

Meanwhile, if an area to be printed with high density and in a single color, such as a background area and a logo area, is composed of a single specific color, correction of an Lab value which is an input value into a look-up table that defines a conversion relationship from an Lab value into a CMYKOGV signal enables correction of the specific color in an area where ink of the specific color is used.

That is, a CMYK image in which a signal of a standard color is used instead of a signal of a specific color, or in an RGB image, can be corrected for color using a conversion relationship from an Lab value into a CMYK value acquired by reverse conversion of a conversion relationship from a CMYK value into an Lab value, based on information on a conversion relationship from a CMYK value into an Lab value in the look-up table A2B in the ICC profile, and also a specific color image in which a signal of a specific color is used can be corrected for color by using information on a conversion relationship from an Lab value based on a colorimetric value of a specific color patch into a CMYKOGV value. As a result, it is possible to easily correct colors in both of an area where ink of the specific color is used, and an area where ink of the standard color is used.

Although the present embodiment shows an aspect of creating a color profile of seven-color including specific colors from standard colors of four-color, for example, a color profile based on standard colors of three-color is also available. In addition, colors after conversion includes at least one specific color, and the number of the colors may exceed the number of standard colors.

For example, a color profile to be used when an RGB signal value is converted into a CMYKOGV signal may be created, and a color profile to be used when a CMYK signal is converted into a CMYKOG signal value may be also created.

The method for creating a color profile, and the program for creating a color profile, described above, can be appropriately modified, added, and eliminated within a range without departing from the spirit of the presently disclosed subject matter. In addition, each of the embodiments described above can also be appropriately combined.

What is claimed is:

1. A method for creating a color profile that is to be applied to image formation by an ink-jet method using ink of standard colors composed of three or more kinds of colors, and one or more kinds of ink of specific colors acquired by mixing two or more kinds of the ink of the standard colors, the method comprising:
    a step of creating a first table that defines a conversion relationship from a signal of a first standard color to which limitation of a total amount of ink is not applied, the signal of the first standard color expressing a standard color, into a signal of a second standard color to which the limitation of the total amount of ink is applied;
    a step of creating a second table that defines a conversion relationship from the signal of the second standard color outputted according to the first table into a first expansion color signal including one or more kinds of signals of specific colors in which the signal of the second standard color and a plurality of signals of standard colors are mixed, to which first expansion color signal the limitation of a total amount of ink is applied;
    a step of creating a third table that defines a conversion relationship from a color signal in a device-independent color space corresponding to the signal of the second standard color in the first expansion color signal into a color signal in a device-dependent color space based on a conversion relationship from a color signal in the device-dependent color space into a color signal in the device-independent color space, acquired by converting the first expansion color signal outputted according to the second table into a color signal in the device-independent color space corresponding to the first expansion color signal; and
    a step of creating a fourth table serving as a color profile that defines a conversion relationship from a color signal in the device-independent color space, corresponding to the signal of the second standard color, in the first expansion color signal, into a second expansion color signal including one or more kinds of signals of specific colors mixed with a plurality of signals of standard colors in the device-dependent color space, by using the conversion relationship defined by the third table and the conversion relationship defined by the second table.

2. The method for creating a color profile according to claim 1,
    wherein the step of creating a second table includes a step of creating a rule of substitution of a signal value of a specific color component, in which step a maximum value of a signal of standard colors constituting the signal of a specific color is substituted with a maximum value of the signal of the specific color.

3. The method for creating a color profile according to claim 2,
    wherein the step of creating a second table includes a step of acquiring a mixing ratio among the plurality of the signals of the standard colors that is to be substituted with the signal of the specific color, and
    wherein in the step of creating a rule of substitution of a signal value of a specific color component, a rule of substituting the plurality of the signals of the standard colors with the signal of the specific color is created based on the mixing ratio acquired.

4. The method for creating a color profile according to claim 2,
    wherein in the step of creating a rule of substitution of a signal value of a specific color component, a rule of substituting the plurality of the signals of the standard colors with the signal of the specific color is created by using a function f(S) for defining a substitution ratio of the plurality of the signals of the standard colors with respect to chroma S.

5. The method for creating a color profile according to claim 3,
    wherein in the step of creating a rule of substitution of a signal value of a specific color component, a rule of substituting the plurality of the signals of the standard colors with the signal of the specific color is created by using a function f(S) for defining a substitution ratio of the plurality of the signals of the standard colors with respect to chroma S.

6. The method for creating a color profile according to claim 4,
    wherein the function f(S) is equal to 0 in a low chroma area in which chroma is equal to or less than predetermined chroma.

7. The method for creating a color profile according to claim 2,
    wherein in the step of creating a rule of substitution of a signal value of a specific color component, a rule of substituting the plurality of the signals of the standard colors with the signal of the specific color is created by using a function g(H) for defining a substitution ratio of the plurality of the signals of the standard colors with respect to hue H.

8. The method for creating a color profile according to claim 3,
    wherein in the step of creating a rule of substitution of a signal value of a specific color component, a rule of substituting the plurality of the signals of the standard colors with the signal of the specific color is created by using a function g(H) for defining a substitution ratio of the plurality of the signals of the standard colors with respect to hue H.

9. The method for creating a color profile according to claim 4,
    wherein in the step of creating a rule of substitution of a signal value of a specific color component, a rule of substituting the plurality of the signals of the standard colors with the signal of the specific color is created by using a function g(H) for defining a substitution ratio of the plurality of the signals of the standard colors with respect to hue H.

10. The method for creating a color profile according to claim 5,
wherein in the step of creating a rule of substitution of a signal value of a specific color component, a rule of substituting the plurality of the signals of the standard colors with the signal of the specific color is created by using a function g(H) for defining a substitution ratio of the plurality of the signals of the standard colors with respect to hue H.

11. The method for creating a color profile according to claim 7,
wherein the function g(H) is equal to 1 in an area in which a hue value is not less than a predetermined first hue value and not more than a predetermined second hue value.

12. The method for creating a color profile according to claim 1,
wherein each of the signal of the first standard color and the signal of the second standard color is composed of a cyan signal expressing cyan, a magenta signal expressing magenta, a yellow signal expressing yellow, and a black signal expressing black.

13. The method for creating a color profile according to claim 12,
wherein each of the first expansion color signal and the second expansion color signal includes at least any one of an orange signal expressing orange, a green signal expressing green, and a violet signal expressing violet.

14. A non-transitory tangible computer-readable recording medium including a program for creating a color profile that is to be applied to image formation by an ink-jet method using ink of standard colors composed of three or more kinds of colors, and one or more kinds of ink of specific colors acquired by mixing two or more kinds of the ink of the standard colors, stored thereon, such that when the program is read and executed by a computer, the computer serves as:

a device of creating a first table that defines a conversion relationship from a signal of a first standard color, to which limitation of a total amount of ink is not applied, the signal of the first standard color expressing a standard color, into a signal of a second standard color to which the limitation of the total amount of ink is applied;

a device of creating a second table that defines a conversion relationship from the signal of the second standard color outputted according to the first table into a first expansion color signal including one or more kinds of signals of specific colors in which the signal of the second standard color and a plurality of signals of standard colors are mixed, to which first expansion color signal the limitation of a total amount of ink is applied;

a device of creating a third table that defines a conversion relationship from a color signal in a device-independent color space corresponding to the signal of the second standard color in the first expansion color signal into a color signal in a device-dependent color space based on a conversion relationship from a color signal in the device-dependent color space into a color signal in the device-independent color space, acquired by converting the second standard signal into the first expansion color signal using the second table to convert the first expansion color signal into a color signal in the device-independent color space corresponding to the first expansion color signal; and a device of creating a fourth table serving as a color profile that defines a conversion relationship from a color signal in the device-independent color space, corresponding to the signal of the second standard color, in the first expansion color signal, into a second expansion color signal including one or more kinds of signals of specific colors mixed with a plurality of signals of standard colors in the device-dependent color space, by using the conversion relationship defined by the third table, and the conversion relationship defined by the second table.

* * * * *